United States Patent
Kieslich

(10) Patent No.: US 10,927,471 B2
(45) Date of Patent: Feb. 23, 2021

(54) GALVANICALLY DECORATED COMPONENT MADE OF PLASTIC, AND METHOD FOR PRODUCING A PLASTIC COMPONENT HAVING A STRUCTURED SURFACE

(71) Applicant: Gerhardi Kunststofftechnik GmbH, Luedenscheid (DE)

(72) Inventor: Dirk Kieslich, Plettenberg (DE)

(73) Assignee: Gerhardi Kunststofftechnik GmbH, Luedenscheid (DE)

( * ) Notice: Subject to any disclaimer, the term of this patent is extended or adjusted under 35 U.S.C. 154(b) by 186 days.

(21) Appl. No.: 15/554,475

(22) PCT Filed: Oct. 28, 2015

(86) PCT No.: PCT/EP2015/075010
§ 371 (c)(1),
(2) Date: Aug. 30, 2017

(87) PCT Pub. No.: WO2016/142005
PCT Pub. Date: Sep. 15, 2016

(65) Prior Publication Data
US 2018/0044808 A1 Feb. 15, 2018

(30) Foreign Application Priority Data
Mar. 11, 2015 (DE) .................... 20 2015 001 879.3

(51) Int. Cl.
| | |
|---|---|
| B29C 45/16 | (2006.01) |
| B44C 1/22 | (2006.01) |
| C23C 18/16 | (2006.01) |
| C23C 18/31 | (2006.01) |
| C23C 18/32 | (2006.01) |
| C25D 5/14 | (2006.01) |
| C25D 5/48 | (2006.01) |
| B44C 3/00 | (2006.01) |
| C25D 5/02 | (2006.01) |
| C25D 5/56 | (2006.01) |
| C23C 18/22 | (2006.01) |
| C23C 18/38 | (2006.01) |
| C23C 18/12 | (2006.01) |

(52) U.S. Cl.
CPC ............... *C25D 5/14* (2013.01); *B29C 45/16* (2013.01); *B44C 1/228* (2013.01); *B44C 3/005* (2013.01); *C23C 18/1641* (2013.01); *C23C 18/1651* (2013.01); *C23C 18/31* (2013.01); *C25D 5/024* (2013.01); *C25D 5/48* (2013.01); *C25D 5/56* (2013.01); *C23C 18/122* (2013.01); *C23C 18/32* (2013.01); *C23C 18/38* (2013.01)

(58) Field of Classification Search
None
See application file for complete search history.

(56) References Cited

U.S. PATENT DOCUMENTS

| | | | | |
|---|---|---|---|---|
| 5,851,335 | A * | 12/1998 | Budnik | B23K 26/18 156/257 |
| 9,017,775 | B2 * | 4/2015 | Mayer Pujadas | B44F 1/02 427/556 |
| 2001/0054564 | A1 * | 12/2001 | Bethune | B44C 1/228 206/459.5 |
| 2008/0136065 | A1 * | 6/2008 | Ohlinger | B23K 26/36 264/482 |
| 2014/0354755 | A1 | 12/2014 | Ashtiani et al. | |
| 2015/0258716 | A1 | 9/2015 | Hanning | |
| 2017/0266690 | A1 * | 9/2017 | Shimada | B05D 3/12 |

FOREIGN PATENT DOCUMENTS

| | | |
|---|---|---|
| EP | 2 551 383 A2 | 1/2013 |
| EP | 2 730 429 A1 | 5/2014 |
| FR | 2 806 936 A1 | 10/2001 |

OTHER PUBLICATIONS mask. (1992). In C. G. Morris (Ed.), Academic Press Dictionary of Science and Technology (4th ed.). Oxford, UK: Elsevier Science & Technology. Retrieved from https://search.credoreference.com/content/entry/apdst/mask/0?institutionld=743 (Year: 1992).*
International Search Report of PCT/EP2015/075010, dated Feb. 11, 2016.

* cited by examiner

*Primary Examiner* — Jose I Hernandez-Kenney
(74) *Attorney, Agent, or Firm* — Collard & Roe, P.C.

(57) ABSTRACT

A galvanically decorated component made of plastic has a galvanically applied chrome layer, wherein the chrome layer is processed with a laser in such a way that a mechanically applied brush structure or structure is reproduced on the surface. The component decorated in this way satisfies all requirements in accordance with the respective test specifications of the planned area of application. A method produces a plastic component having a structured surface. Components of this type made of plastic for the automotive industry are substantially decorative and operative elements.

1 Claim, 1 Drawing Sheet

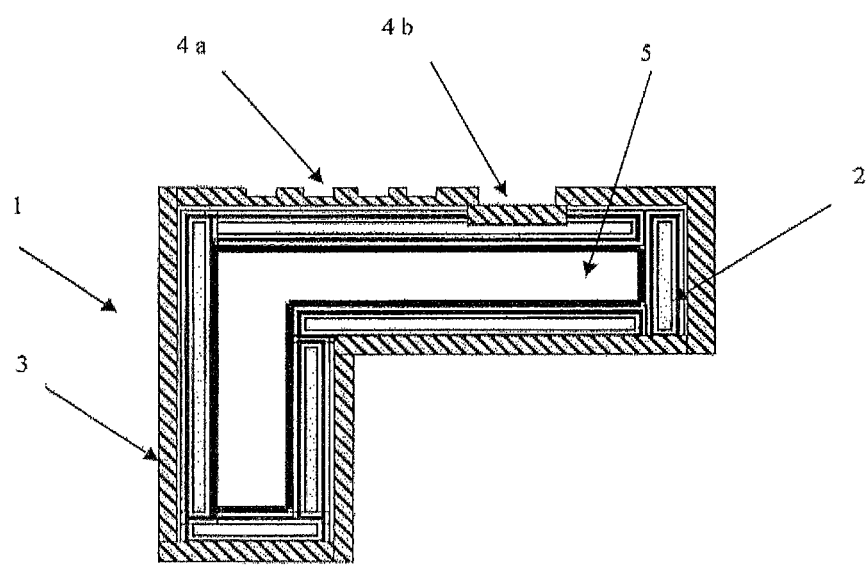

GALVANICALLY DECORATED COMPONENT MADE OF PLASTIC, AND METHOD FOR PRODUCING A PLASTIC COMPONENT HAVING A STRUCTURED SURFACE

CROSS REFERENCE TO RELATED APPLICATIONS

This application is the National Stage of PCT/EP2015/075010 filed on Oct. 28, 2015, which claims priority under 35 U.S.C. § 119 of German Application No. 20 2015 001 879.3 filed on Mar. 11, 2015, the disclosure of which is incorporated by reference. The international application under PCT article 21(2) was not published in English.

The invention relates to a galvanically decorated component made of plastic, having a layered structure and a texture or brushed texture introduced into the surface of the chrome layer on the visible side. The invention furthermore relates to a method for the production of a plastic component having a textured surface.

The components made of galvanized plastic, of the type being considered here, are essentially decorative and operative elements for the automotive industry.

In motor vehicles, brushed surfaces on decorative and operative elements are frequently used for optical and esthetic reasons, for example. Such brushed textures are currently applied almost exclusively on true metals such as aluminum or stainless steel. The machined metals are then used as thin sheets, which are generally shaped to the desired contour before or after brushing, generally in a subsequent stamping process, and subsequently connected with the carrier component, in other words the operative element or the decorative element, by means of gluing, back-injection, clamping or other joining methods.

These components are very cost-intensive due to the brushing process, which can be automated only with difficulty, and the subsequent forming of the metal sheets, and are furthermore subject to forming technology limits. Also, partial brushings on a surface level are possible only in very complicated manner, by means of masking.

Different approaches are known for replicating metallic, brushed or textured surfaces on components made of plastic:

For example, one replication is based on the fact that a brushed texture is introduced into the surface-forming side of the injection-molding die, and transferred to the plastic component there during the injection-molding process. Metallization of the surface can take place in a subsequent surface-coating process, for example thin-layer metal transfer by means of the PVD process (Physical Vapor Deposition).

In the PVD process, thin layers are deposited in a vacuum. The material to be deposited is present in solid form. The vaporized material moves through the vacuum chamber and impacts the components to be coated, where layer formation takes place. The textures, brushed textures or scars formed and introduced in the die are replicated with very great detail accuracy by means of the PVD layer that builds up and has a thickness of only a few micrometers to nanometers. However, it has proven to be problematical that the metal layer deposited in this way, which is very thin, does not demonstrate sufficient resistance to friction wear without application of an additional protective layer. For this reason, a protective layer, for example composed of varnish, is applied in this process after application of the PVD layer. However, the costs are increased due to this additional work step. Furthermore, the warm haptic impression of the components produced using the PVD process, in contrast to the cold haptics of the true metal parts or of the galvanized surface, is not perceived as being appealing in terms of quality.

Furthermore, methods are known in which plastic films are stamped with a corresponding brushed texture. A metal-colored printed layer is generally applied to the back of these films. Depending on the contour, these films are punched or formed and placed into a shaping injection-molding tool. In the subsequent injection-molding process, the film permanently connects with the plastic substrate and shows the desired brushed texture on the surface. A brushed texture can be optically imitated in this way, as well; however, such components, decorated using the IML process (in-mold labeling) or FIM process (film-insert molding), cannot meet metallic-haptic and quality demands.

A further possibility for the production of such surfaces is offered by the IMD method (in-mold decoration). In this regard, a film carrier is provided with a brushed texture by means of stamping or rolling, and imprinted with a thermo-transfer varnish system that looks metallic. In the injection-molding process, the stamped brushed texture is then pressed onto the injection-molded part and the varnish system that looks metallic is transferred. Here, too, a brushed component that looks metallic, but without metallic haptics, is formed.

Attempts to transfer a brushed texture onto galvanized components have failed until now, due to various technical aspects:

For example, it is true that a brushed texture or texture introduced into the surface-forming side of the injection-molding die is accurately replicated by the plastic material, but due to the metal layers that are deposited during the subsequent galvanization process, the brushed texture or texture is leveled out to such an extent that the optical impression is completely lost.

The standard buildup of a chrome decoration galvanically deposited onto plastic begins after chemical roughening and autocatalytic deposition of very thin ancillary conductive layers. These generally consist of nickel or copper with a thickness of a few tenths of a micrometer ($\mu m$). Subsequent to autocatalytic deposition, the component passes through electrolytic deposition. In a first functional bath, the very thin ancillary conductive layer is reinforced by electrolytically deposited nickel or by what is called an autocatalytic copper layer. Subsequent to this, a copper layer that is relatively thick in comparison with the entire layer thickness is deposited. This layer generally amounts to 15 to 25 $\mu m$, serves as a ductile layer for leveling, and balances out the different temperature expansions of the plastic substratum and the layered metal structure. After the copper layer has been deposited, further nickel layers are deposited. These generally consist of a semi-gloss nickel layer having a thickness of approximately 8 to 10 $\mu m$, a high-gloss nickel layer having a thickness of approximately 8 to 10 $\mu m$, as well as a corrosion-controlling, cracked or porous nickel layer having a thickness of 1.5 to 2.5 $\mu m$. Subsequently and finally, depending on the use of the component as an exterior or interior component, and depending on customer specifications, a chrome layer having a thickness of approximately 0.3 to 0.5 $\mu m$ is deposited in the case of a micro-porous nickel layer, and of approximately 0.6 to 0.8 $\mu m$ in the case of a micro-cracked nickel layer.

Only this multi-layer structure represents a controlled corrosion progression by means of corrosion current distribution at cracks and pores. If a brushed texture is now introduced mechanically, it destroys the corrosion mechanism of the chrome component because of the depth of the mechanical brushing process. Furthermore, nickel layers are exposed due to the mechanical damage to the brushed textures, and this might trigger allergies.

This is where the invention wishes to provide a remedy.

The invention is based on the task of making available a galvanically decorated plastic component having a texture or brushed texture introduced into the surface, which component avoids the above disadvantages and, in particular, in which component the corrosion mechanism of the chrome component is not destroyed and no nickel layers are exposed.

According to the invention, this task is accomplished in that the texture or brushed texture in the surface on the visible side replicates a brushed texture or texture after galvanic deposition.

The task is furthermore accomplished by a method for the production of a plastic component having a textured surface, in which method the component is produced from plastic by means of injection molding, subsequently is galvanized, and a texture is introduced on the surface of the component on the visible side, wherein the texture is introduced into the component according to the default values of a data set, which is obtained by means of program technology or by means of recording a texture or brushed texture of the surface of a reference component.

With the invention, the possibility is created of creating a galvanized plastic component having a textured surface, in which the surface represents an almost identical replication of the surface, for example a brushed surface, or a metallic component.

In a further development of the invention, the texture is introduced into the surface of the component by means of a combusting and displacing laser. Working of the surface by means of a combusting laser offers the possibility of replicating the surface of a reference component or of a designed texture very precisely. Furthermore, the combustion depth can be influenced very precisely by means of the laser, so that penetration into the nickel layers can be prevented and the corrosion mechanism of the chrome component is also not destroyed.

It is advantageous if the data set is processed. In this way, the possibility exists of adding special characteristics to the textured surface. For example, the texture of the surface can be influenced by means of processing of the data set, for example by means of setting a reduced combustion depth for the laser in certain regions. For example, a set of symbols can be created within the textured surface, for example in the form of letters or numbers that can represent the vehicle model or the equipment version. These regions can also have a textured surface, so that the entire visible side of the component gives the impression of brushed metal, for example, but at the same time, the letters or numbers are recognizable.

Furthermore, it is possible, by means of processing of the data set, to also leave some regions completely unworked, and these regions, as high-gloss symbols or intarsia, in turn can be surrounded by textured or brushed surroundings.

It is extremely preferred if the extreme values of the recorded surface of a reference component are masked out during processing of the data set. In this way, particular depths or heights contained in the reference surface, which can occur during mechanical processing of the reference component, can be filtered out, for example in order to prevent depths that would result in penetration of the laser into the nickel layers during subsequent processing using the combusting and displacing laser.

Other further developments and embodiments of the invention are discussed below. An exemplary embodiment of the invention is shown in the drawings drawing and will be described in detail below. The FIGURE shows:

FIG. 1 the schematic representation of a galvanized component made of plastic, in the form of a button.

The coated component 1 shows a product produced from plastic for the automotive industry—a button—with subsequent galvanization. The plastic is a galvanizable plastic 5, for example ABS plastics (acrylonitrile-butadiene-styrene copolymerizates) as well as mixtures with polycarbonate(s). After completion of the galvanic coating process, the component 1 has a layered structure 2 as required by the demands of the respective area of use. The layer thickness of the final chrome layer 3 amounts to approximately 1.0 μm to 1.2 μm. It is consequently higher by 0.1 μm to 0.8 μm, preferably by 0.2 μm to 0.5 μm than the topography region of a texture or brushed texture that was derived from a reference component that is provided with a conventional brushed texture or texture. The reference component is generally a metal component having a brushed surface. The component, subsequently processed by means of laser ablation and displacement 4a or mechanical brushing 4b, finally has a texture on the visible side of the surface, which texture corresponds to a brushed metal surface.

In the method for the production of a plastic component having a textured surface, preferably a reference surface is recorded at first. Generally, the reference surface is a brushed or textured surface of a metal component. Recording of the surface preferably takes place by means of optical scanning, for example using a laser. In this regard, a point of light is produced, which is moved over the reference surface. The light is reflected by the surface and the reflection is recorded. Because of the different heights and depths of the textured surface, different wavelengths occur during reflection, and these are measured, digitalized, and stored in memory.

Alternatively, recording of the reference surface can take place by means of scanning using a mechanical sensing device. For this purpose, a very thin and sensitive sensing device is moved over the surface and measures the heights and depths of the textured surface. The measurement results are digitalized and stored in memory.

The topography of the reference surface determined in this manner is converted into a processed 3D data set. An STL data set (stereolithography), for example, can be produced as a processed data set. In this data set, the recorded surfaces composed of assembled triangles are described. Other 3D data set formats can also be used.

Furthermore, the possibility also exists of producing the data set by means of programming technology. In this regard, a freely selectable surface texture is programmed and also stored in memory as a 3D data set format. In this regard, the surface texture can agree with a brushed or textured surface of a metal component. However, the possibility also exists of programming different surface textures.

The data set that has been created is then processed in such a manner that the uppermost peaks and lowermost depths are filtered out. In this way, the result is achieved that extreme values within the topography of the reference surface, which were caused, for example, by means of bristles or grinding elements of the brush or grinding device used for brushing the reference surface being torn out, are masked out. In this way, a data set is obtained for the topography, the peaks and depths of which then range in a range between 0.2 to 1.4 μm, preferably in a range between 0.5 μm to 0.9 μm.

The component 1, which is supposed to have a surface that looks similar to a brushed surface on its visible side after completion of the method, is injection-molded in known manner from plastic. Subsequently, the component 1 to be processed is galvanized, with a layered structure that meets the requirements demanded by the respective area of use being produced. After galvanization, the component 1 has a chrome layer thickness that is greater than the total topography range of the recorded and processed texture or brushed texture of the reference surface after processing of the data set, in other words after elimination of the extreme values. Preferably, the layer thickness of the final chrome layer is greater by 0.1 μm to 0.8 μm, preferably by 0.2 μm to 0.5 μm, than the height of the topography range of the reference surface after processing of the data set.

Afterward, the chrome surface of the component 1 is worked using a combusting and displacing laser beam, in accordance with the processed data set of the brushed texture or texture. In this regard, the chrome surface is partially combusted and displaced by the laser. Combustion takes place in the center of the laser beam. Around the center of the laser beam, in other words in the edge region of ablation, no combustion takes place; instead, displacement of the chrome layer takes place, causing warping. Combustion takes place as a function of the topography of the reference surface stored in the processed data set without the eliminated extreme values, with the depths being created by greater combustion and a longer working time, and heights by lesser and shorter combustion of the chrome surface. During working of the surface, it is decisively important to pay attention to not allowing combustion and displacement to reach to a depth that is deeper than the thickness of the chrome layer. This must be avoided, since otherwise the laser could destroy the corrosion mechanism of the chrome component and expose nickel layers.

Fundamentally, the brushed texture or texture can also be introduced into the chrome-plated component 1 mechanically. For this purpose, it is practical if the mechanical working of the component 1 is provided at a very much later coating time point in galvanic deposition. It is advantageous if the brushed texture or the texture is introduced after the semi-gloss nickel layer, the high-gloss nickel layer, as well as the corrosion-controlling cracked or porous nickel layer. Introduction after the high-gloss nickel layer has proven to be the preferred time point in this regard. However, for this purpose the components have to be removed from the galvanization process, mechanically worked, and returned to the galvanization process again for final further coating up to chrome. Mechanical working of the chrome layer is also possible, but then the general overall impression is generally one of lesser quality. However, a problem with mechanical production of the desired texture on the component 1 is the fact that the space in which the mechanical working is to take place must be separate from the spaces of galvanization in dust-proof manner, in order to prevent contamination of the galvanization with the dust resulting from mechanical working of the component. However, this is usually connected with high costs.

A significant advantage of designing the galvanically decorated plastic component according to the invention, having a texture or brushed texture introduced into the surface by means of laser processing, is representation of the brushed regions by means of computer-assisted design. Using the method according to the invention, for the first time a precise replica of a brushed texture can be achieved over a plurality of different components. Furthermore, the textured or brushed regions can be precisely defined. Therefore brushed regions and high-gloss regions directly next to one another on the surface of the component are possible; this is not possible using the conventional technology of mechanical brushing.

The invention claimed is:

1. A method for the production of a plastic component having a textured surface, the method comprising:
   producing the component from plastic by injection molding,
   subsequently galvanizing the component such that a layered structure is created on a surface of the component and such that the layered structure has an inner nickel layer and an outer chrome layer deposited over the inner nickel layer,
   obtaining a data set having default values corresponding to a texture or brushed texture to be replicated on the outer chrome layer of the component, wherein the data set is obtained by program technology or by recording a texture or brushed texture of a surface of a reference component,
   processing the data set by masking out selected values of a recorded surface of the reference component or of the data set obtained by program technology during processing of the data set, wherein the selected values masked out correspond to particular depths or heights of the recorded surface of the reference component or of the data set obtained by program technology which are filtered out in order to prevent penetration by a combusting and displacing laser into the inner nickel layer, and
   introducing the texture or the brushed texture into the outer chrome layer with the combusting and displacing laser,
   whereby, in the layered structure, combustion and displacement from the combusting and displacing laser penetrate into the outer chrome layer without penetrating into the inner nickel layer, such that the inner nickel layer of the component is not exposed.

* * * * *